R. RUTH.
PHOTOGRAPHIC PROCESS OF MAKING PRINTS IN NATURAL COLORS.
APPLICATION FILED APR. 5, 1913.
1,093,948.
Patented Apr. 21, 1914.
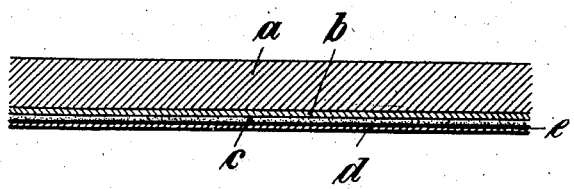
WITNESSES:
INVENTOR:
RUDOLF RUTH
BY
ATTORNEYS

UNITED STATES PATENT OFFICE.

RUDOLF RUTH, OF MORTSELL, NEAR ANTWERP, BELGIUM.

PHOTOGRAPHIC PROCESS OF MAKING PRINTS IN NATURAL COLORS.

1,093,948.   Specification of Letters Patent.   Patented Apr. 21, 1914.

Original application filed November 4, 1909, Serial No. 526,228. Divided and this application filed April 5, 1913. Serial No. 759,013.

*To all whom it may concern:*

Be it known that I, RUDOLF RUTH, a citizen of the United States, residing at Mortsell, near Antwerp, in the Kingdom of Belgium, have invented certain new and useful Improvements in Photographic Processes of Making Prints in Natural Colors; and I do hereby declare the following to be a full, clear, and exact description of the invention, such as will enable others skilled in the art to which it appertains to make and use the same.

My invention relates to improvements in photographic process of making prints in natural colors.

As is well-known, a plate exposed behind a Joly-McDonough screen after its reversal reproduces the colors of the photographed object presupposing that the positive thus obtained occupies exactly the position of the plate during the original exposure relative to the screen. Proceeding from this, I have found, in principle, the possibility of reproducing natural colors on paper as soon as it is possible to remove from the screen those parts thereof which do not participate in producing the picture and to transfer the remaining parts, namely those which did participate in producing the picture, onto paper. To accomplish this I employ a selective color screen of the Joly-McDonough type in which the primary colors are supported upon or within a gelatin film developable after the principle of the carbon or pigment process, or the gum bichromate process, or the like. Instead of gelatin any one of a number of recognized equivalent materials such as gum arabic or albumen may be used.

My invention is represented by way of example in vertical section in the accompanying drawing.

Referring to this drawing, a glass or film support $a$ is preliminarily prepared by applying thereto a pellucid layer or film $b$ of gelatin. On said film $b$ rests the screen $c$ which is removable in the way of stripping plates and consists of a substance for example gelatin, which can be developed by means of the bichromate process. The elements of this screen which is otherwise of optional kind, such as a line, grain or mosaic screen, are stained with colors which are either soluble or insoluble in water, but in any event transparent and are composed, according to well-known principles, of the colors red, blue and green for example arranged in regular and recurrent order after the manner of Joly-McDonough. The particles of the stained material are either suspended in the gelatin film or applied on the same. Adhering to this screen which is protected by a flexible waterproof layer $e$ of caoutchouc or film negative varnish, there is a film $d$ of color sensitive, panchromatic emulsion. The plate made in this manner forms both the exposure and simultaneously the copying material.

The exposure takes place, through the glass or film $a$ together with the gelatin layer $b$ and color screen $c$ either in the camera or under a colored diapositive, if desired with a suitably colored filter. The plate is then developed from the side of the emulsion $d$; the black silver picture produced is dissolved in a suitable bath and then the remaining silver bromid is blackened by a second development in daylight. So far the mode of operation for diapositive and copying process on paper is identical. If the former is desired, the operations are substantially finished. From the diapositive (or transparency to be viewed by transmitted light) thus obtained any number of copies on paper can be printed in the camera or in the copying frame. If a colored print is desired the support $a$, after the diapositive has been produced as thus described, is stripped away from said diapositive and its attached color screen $c$ the gelatin layer $b$ dissolving away in the process; the color screen $c$ is then sensitized with bichromate solution and dried in the dark room after which it is exposed in the copying frame for a definite interval to light passing through the adherent diapositive. The screen is then developed in the usual manner with the result that those portions of said screen corresponding to blacks in the diapositive will be dissolved away. If now screen and attached diapositive be transferred to paper in the usual way, I have a positive taken with correct color values and viewable through a Joly-McDonough screen by reflected light, *i. e.*, a colored print.

This application is a division of my application filed November 4, 1909, Serial Number 526,228.

I claim:

1. The process of making prints in natural colors which comprises making a positive through a Joly-McDonough screen, exposing through said positive a superposed film which is developable by the bichromate process and which has a Joly-McDonough screen formed upon or within it, developing said film, and transferring said superposed film and positive to paper.

2. The process of making prints in natural colors which comprises making a positive through a Joly-McDonough screen, exposing through said positive a superposed film which is developable by the bichromate process and which has a Joly-McDonough screen formed upon or within it, developing said film, and transferring said superposed film and positive, film side up, to paper.

3. The process of making prints in natural colors which comprises making a positive through a Joly-McDonough screen, exposing through said positive a superposed gelatin film, and which has a Joly-McDonough screen formed upon or within it, developing said film, and transferring said superposed film and positive to paper.

4. In the process of making prints in natural colors, the sequence of operations which consists in exposing through a positive a superposed film developable by the bichromate process and having a Joly-McDonough screen formed upon or within it, developing said film, and transferring said superposed film and positive to paper.

5. The process of making prints in natural colors which comprises providing a plate embodying a pellucid support, a sensitive emulsion and a film which may be sensitized by a bichromate solution, said film being between said support and said emulsion, and being further provided with a Joly-McDonough screen, converting said emulsion into a positive by exposure through said screen and subsequent development, stripping said film and said positive as a whole from the support, sensitizing and exposing said film through said positive and then developing the same, and finally transferring said film and diapositive, film side up, to paper.

In testimony whereof I hereunto affix my signature in the presence of two witnesses.

RUDOLF RUTH.

Witnesses:
 HENRY HASPER,
 WOLDEMAR HAUPT.